Feb. 15, 1966   H. SCHNEIDER ET AL   3,234,641
METHOD AND APPARATUS FOR FIXING RELIEF HOROLOGICAL
FIGURES ON A WATCH DIAL PLATE
Filed Sept. 27, 1961   3 Sheets-Sheet 1

United States Patent Office 3,234,641
Patented Feb. 15, 1966

3,234,641
METHOD AND APPARATUS FOR FIXING RELIEF HOROLOGICAL FIGURES ON A WATCH DIAL PLATE
Hans Schneider, Eplatures-Jaunes 23a, La Chaux-de-Fonds, Switzerland, and Gilbert Feller, Ave. de l'Hopital 6, Le Locle, Switzerland
Filed Sept. 27, 1961, Ser. No. 141,086
Claims priority, application Switzerland, Sept. 28, 1960, 10,921/60
20 Claims. (Cl. 29—470)

The present invention relates to dials for watches and in particular concerns a method and an apparatus for fixing relief horological figures or indicia to a watch dial plate.

Dials with relief horological figures are normally manufactured by fixing the figures on the dial plate by screwing riveting or electrical resistance welding. All these methods require meticulous preparation of the figure and/or of the dial plate, prior to the connection as each figure must normally be provided with feet, points or threads.

Moreover, it often happens in the course of resistance welding that sparks or molten metal from one of the parts to be assembled gush up around the base of the figure thus forming a visible burr, even if, according to a proposed improvement of that method on one of the two surfaces coming into mutual contact a protrusion is provided the contact surface of which is smaller than the base of the element which has to be fixed, whereas in the other surface of the protrusion a cavity and a lateral clearance are provided between the protrusion and the cavity for taking up the burr generated during the welding operation.

Though it is possible to accelerate the welding operation by using electric resistance welding, its drawbacks on account of the frequent rejects have lead to searches for other methods which preferably have the advantages of the electric welding but not its disadvantages.

During this research applicants remembered some publications concerning a welding method called "ultrasonic welding" and mentioning the possibility of uniting metallic parts without fusion by pressing together the parts to be welded and by vibrating one of these parts at an ultrasonic frequency. As no particular application of this method was known, everything had to be done if it was desired to apply this method to the welding of relief horological figures to a watch dial plate. Applicants' efforts having given positive results it is an object of the present invention to teach the practical and industrially available application of a method of manufacturing watch dials with relief horological figures and of an apparatus for carrying out this method.

The present invention provides a method comprising the steps of placing a horological relief figure on a tool with its surface intended to contact the dial plate facing the exterior of retaining the dial plate against a support with its surface to be provided with figures facing said figures, of approaching the contact surfaces of the horological figure and of the dial plate and of pressing them together in the desired relative fixing position of vibrating one of the two elements destined to be fixed together parallel to the other at an ultrasonic frequency during a sufficiently long period to permit the welding of the two contact faces, and of hereafter separating the tool from the support maintaining the dial plate with the horological figure just fixed on it, in order to permit depositing of a new figure on the tool and displacing or exchanging the dial plate in order to enable the fixing of a new figure.

The welding is effected by friction between the horological figure and the dial plate. This friction which cleans the two contacting surfaces provokes a molecular burst affording for the welding through the static pressure at such points where welding conditions are attained by the vibratory action. As soon as the adherence between the two parts is strong enough to hinder further relative movements between them no new welding points are formed anymore. Obviously use of a great vibratory energy results in a greater amount of welding points before the relative movement between the figure and the dial plate becomes impossible.

Preferably it is the figure-bearing tool that is caused to vibrate at an ultrasonic frequency and this advantageously in a direction parallel to the longitudinal extension of the figure whereas the dial plate is maintained in an upside down position by pressing it on its support and is lowered onto the figure perpendicularly to the vibratory plane, whereupon the dial plate is pressed against the figure and, through the figure-bearing tool, against a stop which forms an inert mass and preferably consists of a plastic material such as "Teflon." By proceeding in this way the figure may simply be laid onto the tool without having to be retained, thereon by delicate pincers as would be required if the dial plate was located beneath the figure.

It is even permissible to protect the dial plate by an insulating coat as it is common in this kind of manufacture, for example, by a lacquer layer or a protective film of a plastic material prior to the welding and to effect the welding operation through this coat by using a sufficiently high energy.

Though it has been possible on test runs to weld through a plastic coat of a thickness up to 0.2 mm. it will be advantageous to make the protective coat as thin as possible in order to avoid that the lacquer or the plastic material which is driven out from the contact points during the welding operation and simultaneously carbonized, forms burrs of decomposed material.

A considerable advantage of the method according to the invention is the fact that it permits to manufacture arched or convex dials directly with flat horological figures. Thereby the figure is placed in a flat state on the tool whilst the already arched dial plate is retained against its support. When the figure and the dial plate are pressed together for the purpose of welding, the figure adapts itself to the shape of the dial plate.

The preparation of the face to be welded of the figure may be effected in several ways. A flat and even surface results in robust welds. However, according to the thickness of the protective coat, this face prior to welding may be striated, knurled checkered or otherwise given an uneven surface facilitating the junction.

A further object of the invention is to provide an apparatus for carrying out the above method. Such apparatus in its widest aspect comprises an element connected with a source of ultrasonic vibrations and provided with means for receiving, removably holding and vibrating a horological figure to be welded, a support adapted to removably maintain a dial plate, and means adapted to move said support with its dial plate in contact with a figure to be welded and to press said plate against this figure in a direction perpendicular to the axis of the vibrations acting on the figure.

Other objects and features of the invention will be apparent as the following description proceeds, reference being made to the accompanying drawings, illustrating several examples thereof. It is, however, understood that the invention is not necessarily limited thereto, as various changes may be resorted to without departing from the principle of the invention or sacrificing any of its advantages. In the drawings:

FIG. 4 is a plan view of that face of the support for the dial plate which carries the dial plate.

FIG. 5 is an enlarged plan view of a figure-bearing tool.

FIGS. 6 and 7 show in a front and a plan view, respectively, an auxiliary device for automatically or semi-automatically conveying horological figures to the welding position.

FIG. 8 illustrates a variant of a detail of the device according to FIGS. 6 and 7.

FIG. 9 shows another variant for conveying figures to the welding position, and

FIGS. 10 and 11 show a front and a sectional view, respectively, of a dial plate provided with figures.

Figure 1:
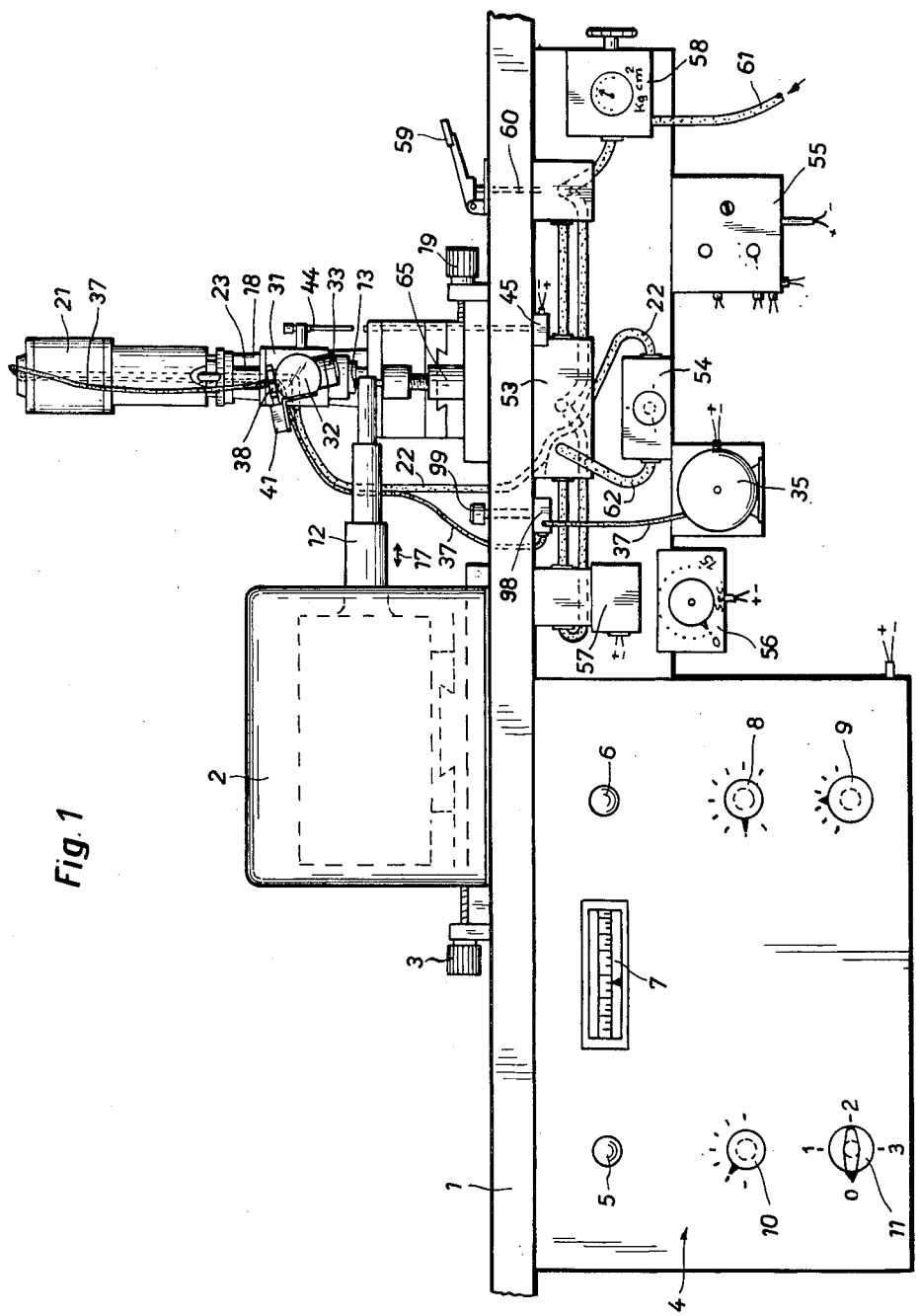
FIG. 1 is a partly diagrammatical general view of an apparatus according to the invention for fixing horological figures on watch dial plates, according to the method of the invention.

In the drawings reference numeral 1 generally designates the plate of a work table or counter supporting the different elements of an apparatus for fixing horological figures to a watch dial plate by ultrasonic welding. A transducer 2 is mounted on this table plate 1 either permanently or, as indicated by dashed lines, movably on a slide permitting by means of a setting screw 3 modifications of the position of the transducer 2 on the table plate 1. A control panel 4 for the generator of ultrasonic frequencies is suspended from the plate 1 and comprises mainly two check lights 5 and 6, an ammeter 7, a power controller 8, a synchronizing controller 9, a timer 10 permitting to control the working period of the generator and a commutator 11. To the transducer 2 is fixed a transmission rod 12 the diameter of which is staggered in such a way that the vibration amplitude is increased at the extremity opposite to the transducer. This rod 12, which may be of soft iron, hardened steel or Monel metal, acts as a vibration amplifier. The first section of the rod 12 is fixed to the transducer by a silver soldering. The following sections are secured to the first one by a soft weld. The steps or shoulders of the rod 12 have a length corresponding approximately to a fourth of the wave length. The tool generally designated by 13 should be placed at a distance from the last step corresponding to a fourth of the wave length. For example if the wave length of the resonnance frequency of the transductor is 240 mm. in the hardened steel of the rod 12, the steps of the rod consequently will have a length of 60 mm. and the working point, i.e., the tool 13 will be set at 60 mm. from the last step or shoulder.

In the embodiment illustrated by the FIGURES 1, 2, 3 and 5 the tool 13 is independent of the transmission rod 12, and therefore, interchangeable. It consists of a taper fitting perfectly into a tapered bore 14 situated at the work points of the rod 12 (FIGS. 2 and 3) and projecting beyond the upper surface of the rod. The base of the taper which is upwardly directed comprises pins 15 (FIG. 5) defining an approximately rectangular area for taking up a horological figure S. Between the pins and the figure in place there is a clearance corresponding to the vibratory amplitude in order to permit relative oscillations between the figure and the tool when the first one is already welded and the latter one still vibrates. In order to prevent gripping of the figure to the tool 13 during the welding operation, the base of the taper may be provided with a chromium coating. Of course, it also is possible to use a tool consisting entirely of an anti-gripping material. Moreover, it has been found that by striating this base, the figure is more easily entrained by the vibrating tool. At its extremity opposite the base the tool 13 is provided with an inner screw thread adapted to receive a locking screw 16 which serves for blocking the tool on the rod 12.

Further embodiments of tools adapted to receive and entrain a horological figure S will be described with reference to the FIGURES 6 to 8.

Figure 2:
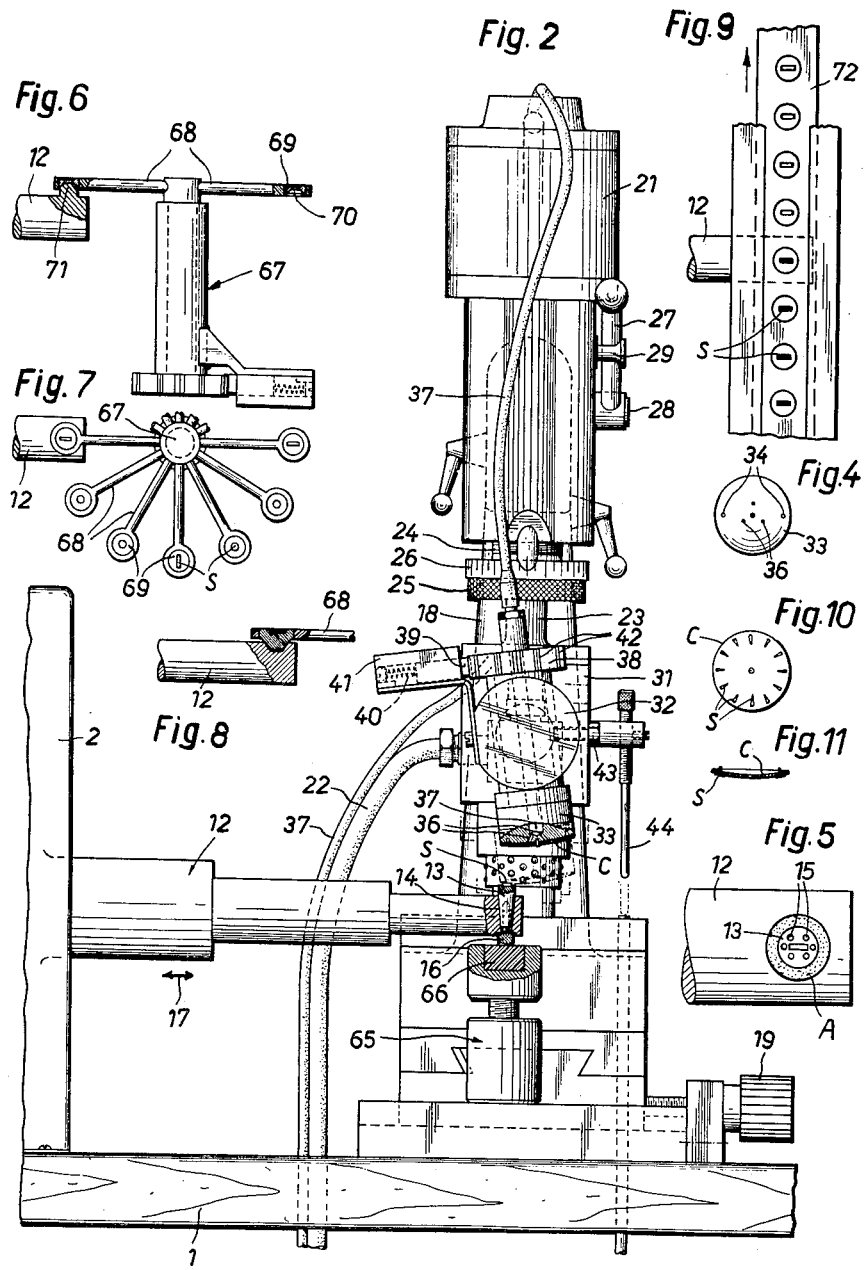
FIG. 2 shows, at enlarged scale, the upper portion of the apparatus of FIG. 1 comprising the support for the dial plate and the tool.
Figure 3:
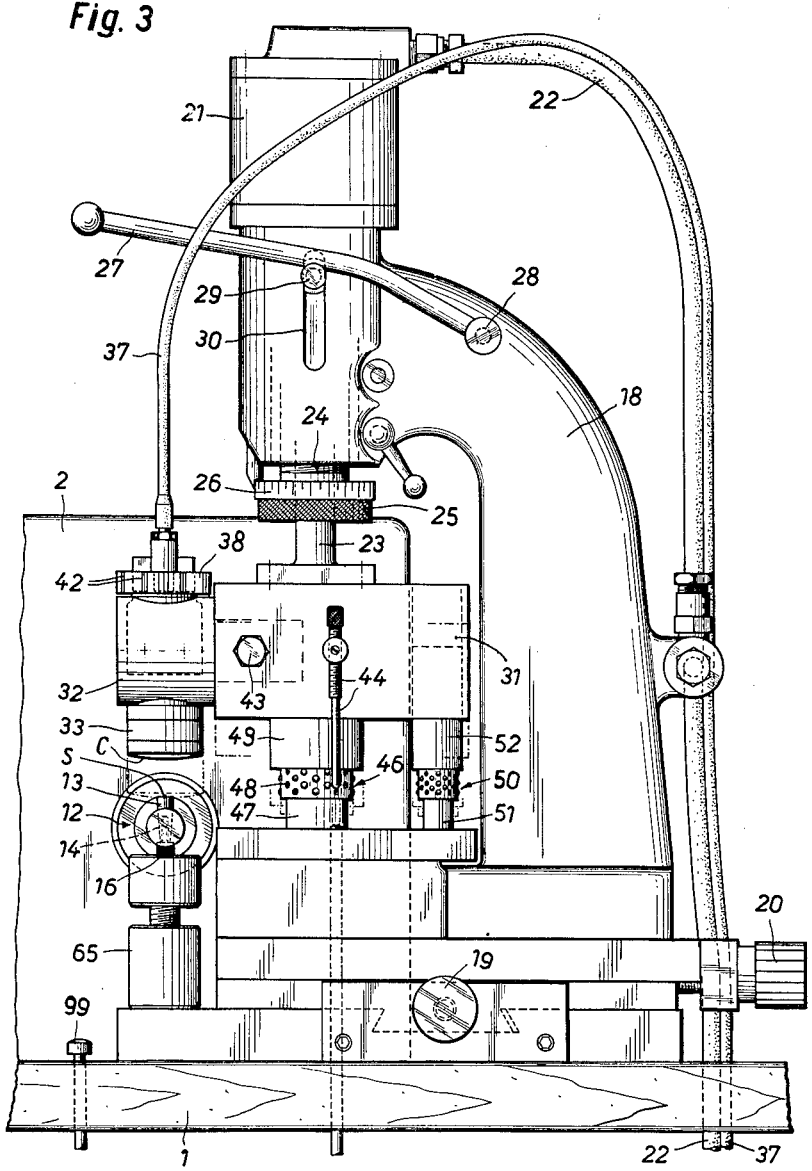
FIG. 3 is a side elevational view of the portion of the apparatus shown on FIGURE 2.

The apparatus described so far serves to communicate to a horological figure S placed on the tool 13 an ultrasonic vibration transmitted to this figure by the rod 12 and the tool 13 when the ultrasonic generator is working, the direction of the oscillations being longitudinal with respect to the axis of the rod as indicated by the arrows 17 on the FIGS. 1 and 2. The frequency and the energy of the vibrations are adjustable in advance and in known manner by the elements 8, 9 and 10 of the control panel 4. Moreover, the timer 10 of this panel permits adjustment of the duration of these vibrations counted from the starting up of the generator.

In order to obtain a welding it is absolutely necessary to press together the two elements to be united whilst one is vibrated at an ultrasonic frequency in a plane parallel to the other. The vibrated element, in the described apparatus, being the figure S in the following the means will be described which permit to maintain, to convey in front of the figure and to press against the latter in the correct position for welding a dial plate on which the figure shall be fixed.

To this end an arm 18 is fixed to the plate 1 of the counter on cross-shaped slides permitting an accurate adjustment in an horizontal plane of the position of the arm 18 by means of perpendicular setting screws 19 and 20. As visible from FIGURE 3 this arm 18 bears at its free end a pneumatic press 21 adapted to impart under the action of compressed air conveyed by a conduit 22 from an exterior source (not shown), a down movement to a spindle 23 against the action of a spring (not shown) located in the housing of the press and pressing the spindle 23 into its raised position as soon as the compressed air supply is stopped and the press 21 is vented. A hollow setting screw 24 the head 25 of which is provided with a graduation 26 affords for precise adjustment of the vertical travel of the spindle 23. Through a hand lever 27 pivoted at 28 to the arm 18 the spindle 23 may be moved against the action of said spring independently of the control by the compressed air. To that end the lever 27 acts upon a piston 29 connected with the piston of the press 21 and leaving the housing of the press through a vertical slot 30 which serves as guide. At the exterior extremity the spindle 23 carries a block 31 provided with a head 32 pivotable about an axis perpendicular to the spindle 23. This head 32 carries an interchangeable support 33 forming a fixture for receiving and retaining a dial plate C (FIG. 2). The surface of the support 33 against which the dial plate C is maintained must have the shape of the dial plate; thus, it will be arched if it receives an arched dial plate and it will be provided with openings 34 (FIG. 4) for taking up the feet of the dial plate. The dial plate C is held in an upside down position against the support 33 by a vacuum created by a vacuum pump 35 (FIG. 1) located beneath the surface 1 and communicating with suction openings 36 (FIG. 4) of the support 33 by means of a conduit 37. Intermediate its length there is connected a venting valve 98 which may be actuated by a push button 99 for relieving the vacuum to the suction openings 36 and permitting to remove the dial plate C from the support. The support 33 is rotatably mounted in the head 32 and is connected with a notched wheel 38 having twelve notches or positions constituted by equally spaced axial and pheripherical grooves 42 which are successively engaged upon rotation of this wheel 38 by a push rod 39 moved in a guide 41 axially and radially to the wheel 38 by a spring 40. The orientation of the head 32, i.e. the inclination of the axis of rotation of the support 33 with respect to the axis of the spindle 32 is adjustable by a setting screw 43. The block 31 further carries an adjustable stop 44 actuating a switch 45 (FIG. 1) when the spindle is lowered as will be described later on.

The travel of the spindle 23 and thereby of the block 31 and of the head 32 with its support 33 is guided in the prolongation of the axis of the spindle 23 beyond the block 31 by a guiding device 46 comprising a vertical post 47 integral with the plate 1 and with the support of the arm 18 and a ball bearing 48 sliding in a guiding socket 49 integral with the block 31. As the support 33 of the dial plate C is carried on a cantilever with respect to the direction of travel of the spindle 23, a flexion of the spindle and a relative displacement between the dial plate C and the figure S could take place when these two elements are pressed together for welding as will be described later on.

In order to avoid any such risk a second guiding device 50 resembling the first mentioned device 46 is provided in front of the support 33 with respect to the axis of the spindle 23. Similarly to the device 46 this second guiding device comprises a vertical stationary post 51 integral with the support of the arm 18, and a ball bearing 52 axially sliding between the post 51 and a bush 52 secured to the lower extremity of the block 31.

Beneath the plate 1 of the counter there are provided setting and control devices (FIG. 1) affording for the automatic or semi-automatic execution of the successive operations of the apparatus according to the invention. Among these devices there are besides the already cited switch 45, the valve 98 and the vacuum pump 35, a three-way valve 53, a flow valve 54, a connection panel 55, a time relay 56, a solenoid valve 57 and a precision pressure reducing valve 58.

In the following the successive operations and the working of the apparatus according to the invention for the manufacture of the dial C provided with relief horological figures S according to the FIGS. 10 and 11 will be described. Thus, an arched dial plate provided with twelve identical figures placed at the hour positions is implied.

In order to adapt the apparatus to the welding of determinate figures as for example the figures S to a dial plate of appropriate dimensions and shape for example the dial plate C, a tool 13 is fixed in the taper bore 14 of the rod 12, the location of the pins 15 of this tool being such that the figure S will be retained without too much or too little clearance. Of course, instead of the pins 15 the base of the tool 13 may be provided with a groove or opening adapted to receive one of the figures S. Preferably the tool is adjusted in the rod in such a way that the longitudinal dimension of the figure S is parallel to the vibration and consequently to the axis of the rod 12. On the pivotable head 32 the support 33 for the corresponding dial plate is mounted and by means of the screw 43 the direction of the head, i.e. the inclination of the dial plate is adjusted in such a manner that when the support carrying the dial plate C contacts a figure S on the tool, this figure will have exactly the location and direction it is required to have on the finished dial. Occasionally this preadjustment of the apparatus requires a displacement of the transductor 2 and/or of the arm 18 which is made possible by the setting screws 3, 19 and 20. It will be assumed in the following that the pressure with which the elements to be welded are pressed together and the vibratory frequency are identical for all types of dials and figures. Of course, both of these characteristics are adjustable, too.

After this preadjustment the apparatus is ready for work. The vacuum pump 35 is started up and a dial plate C provided with a protective coat or without such coat is placed against the support 33 the feet of the plate penetrating into the openings 34 of the support 33. As soon as the suction openings 36 of the support 33 are closed by applying the dial plate C against the support 33 said plate is held against the support in its upside down position.

Thereupon a horological figure S cut out of a tape is placed on the tool 13 with the face to be welded turned to the exterior opposite to the dial plate situated above.

The two elements to be united being in place for welding the operator actuates a lever 59 (FIG. 1) mounted on the plate 1 and held by a spring in the represented position. The pushing down of this lever releases a series of successive operations required for the welding so that the operator is freed from any manipulation until all elements of the apparatus have returned to their starting position indicated in FIG. 1 the horological figure S being welded to the dial plate.

Indeed, by pushing down the lever 59 a slide of the three-way valve 53 is actuated by a rod 60 in a manner to allow compressed air supplied by a conduit 61 from a source (not shown) and passing through the pressure reducing valve 58, to the press 21 by passing from the three-way valve 58 through a conduit 62, the valve 54 regulating its flow and the conduit 22. The compressed air arriving at the press 21 lowers the spindle 23 carrying the block 31, the pivotable head 32, the dial-carrying support 33 and the adjustable stop 44 until the dial is pressed with its face to be welded to the face to be welded of the figure S placed on the tool 13. Simultaneously with the contacting of the dial plate with the figure, the stop 44 having been lowered together with the spindle 23 actuates the switch 45 which closes the circuit of the generator 2 and at the same time initiates the time relays 56 and 10. During the predetermined working time of the switch 10 the figure S placed on the rod 12 is vibrated at ultrasonic frequency in direction of the arrows 17 thus in direction of its length and parallel to the plane of the dial plate C which is pressed against it by the action of the press 21. This results in a relative friction between the figure and the dial plate which friction besides cleaning the two contact surfaces and removing at this place any protective coat on the dial plate, provokes by molecular burst the welding of two contacting parts under the action of the static pressure exerted by the press 21. At the expiration of the interval to which the switch 10 has been set and which suffices for the welding, the switch 10 interrupts the circuit of the transductor and consequently the vibration of the figure. Immediately afterwards the switch 56 which is set accordingly actuates the solenoid valve 57 which controls the return of the piston of the press 21 under the action of its spring by operating a slide of the three-way valve 53 thus liberating the compressed air in the press 21. The spindle returns into its upper starting position shown in FIG. 1 thus nullifying the action of the switch 45.

All elements are thus again in the starting position ready for a further welding operation, for which the operator will only have to place a new figure S on the tool 13 instead of the one which just has been welded to the dial plate and rotate the wheel 38 by one notch for presenting a new position of the dial plate to the new figure. After having finished this manipulation the operator starts by operating the lever 59 a new welding operation similar to the described one. As soon as the twelve figures or the appropriate number of figures to be welded to the dial plate retained on the support 53 are fixed, the finished dial is replaced with a new one by interrupting the vacuum in the conduit 37 by actuating the push rod 99 which permits easy removal of the finished dial.

The notched wheel 38 may also be indexed automatically e.g. by means of an electromagnetic or mechanical device which rotates the dial plate by a twelfth of a complete revolution at each ascension of the spindle. The danger resulting from such an automatization of welding two figures on each other, if the dial has inadvertently not been removed, is avoided by such an adjustment of the stop 44 that the latter does not actuate the switch 45 in such a case.

The adjustment of the welding pressure is effected by the precision pressure reducing valve 58 mounted in the compressed air circuit. In order to obtain a precise pressure this pressure reducing valve may be seconded by another pressure reducing valve (not shown) located at the entry of the press 21. This pressure depends on the applied ultrasonic power. At low power a pressure between 25 to 30 kg. p. sq. mm. gives good results. At higher power this pressure may be reduced to approx. 15 kg. p. sq. mm. Too high a pressure as well as too high a vibration energy may lead to the formation of burrs of metal pressed out around the figure.

It has been found that the time required for the welding varies between 1 and 4 seconds for a power of 500 to 2500 w.

A good guiding of the dial in its movements as it is obtained by the two ball bearings 46 and 50 is necessary for avoiding a flexion of the spindle. Too, it may be necessary to absorb the strong vibrations generated in the dial plate during the welding operation in order to avoid that the already welded figures liberate themselves or that the dial moves. A piece A of rubber or of a similar material (FIG. 5) placed besides the tool in such a manner that it is strongly pressed against the dial during the welding operation fulfills this task very well.

Finally the elasticity of the transmission rod 12 and of the support of the transductor 2 permits a certain amount of vertical movement of the figure-carrying tool in consequence of the pressure exerted by the press 21. In order to avoid this without damping the vibrations an adjustable wedge 65 having a block 66 (FIG. 2) of a plastic material such as "Teflon" is provided under the tool 13.

The figure may also be put on a protrusion integral with the transmission rod 12 and having the same characteristics as the interchangeable tool 13.

FIGURES 6 to 9 show some variants permitting a further automatization of the apparatus.

According to FIGS. 6 and 7 a turnstile 67 is provided with twelve arms 68 of a resilient material each one carrying at its free end a block 69 having a cavity adapted to receive and retain a figure S just as the pins 15 of the tool 12. Each block carries at its surface opposite to the figure a tapered cavity 70 adapted to cooperate with a tapered protrusion 71 at the free end of the transmission rod 12. This turnstile is so arranged that upon its actuation the figures-bearing blocks are brought one by one to the protrusion 71 of the rod for welding. The turnstile 67 may be actuated by hand simultaneously with the notched wheel 38 which causes the dial plate to rotate, or it may be automatically actuated together with the latter one during the ascension of the spindle 23 as it has been described for the support.

Instead of the rod 12 having a protrusion 71 and the block 69 a cavity 70, a tapered cavity may be provided in the rod 12 and the block may have a tapered insert adapted to precisely fit into this cavity as shown in FIGURE 8. The working of this embodiment is the same as for the embodiment according to FIGS. 6 and 7.

An entire automatization of the manufacture of the dial may be obtained by a figure-conveying device as shown in FIGURE 9 where a number of tools being similar to the blocks 69 of the FIGURES 6-8 are mounted one behind the other on a conveying belt 72. The horological figures may be directly placed in their correct position on the tools in the device which cuts the figures out of a sheet metal tape; the conveyor belt may be advanced stepwise on the rod 12 so that a new figure is presented on the rod for each welding operation. The advance of this belt may be synchronized with the rotation of the dial plate and an automatic stop may be provided, for example after the welding of twelve figures in order to permit the change of the dial plate.

Moreover, it is possible to provide a tool adapted for receiving several figures, for example twelve, so that by a single welding operation several figures may be secured to the dial plate simultaneously.

What we claim is:

1. A method of fixing metal relief horological figures on a metal dial plate, comprising the steps of placing the horological relief figure on a tool with the figure surface which is to contact the dial plate facing outwardly of the tool, retaining the dial plate against a support with the dial plate surface to be provided with figures facing said figure, moving the contact surface of the horological figure and the dial plate together and pressing them tightly together in the desired position relative to each other, vibrating one of the two elements to be fixed together parallel to the other at an ultrasonic frequency during a period sufficiently long to permit the welding of the two contact faces while at the same time holding the two elements to prevent movement thereof parallel to each other a distance any greater than the amplitude of the vibrations, and thereafter separating the tool from the support while holding the dial plate with the horological figure fixed on it against said support in order to permit depositing of a new figure on the tool.

2. A method as claimed in claim 1 in which the step of vibrating the figure-bearing tool at an ultrasonic frequency comprises vibrating the one element in a direction substantially parallel to the portion of the dial plate where said figure is to be secured, the step of retaining the dial plate comprises creating a vacuum between the dial plate and the support, the step of moving the surfaces together comprises lowering the dial plate onto the figure perpendicularly to the plane of vibration, and the step of pressing the elements together comprises pressing the dial plate against the figure and supporting said figure against an inert mass.

3. A method as claimed in claim 1, and the further steps of covering the dial plate prior to the welding with a protective coating and of effecting the welding operation through this coating.

4. A method as claimed in claim 1 in which the step of placing the figure on the tool comprises placing said figure so that its longitudinal extension is parallel to the axis of vibration.

5. A method as claimed in claim 1 in which the dial is an arched dial, and the step of placing the figure on the tool comprises placing it in a flat state, the arched dial plate being retained on the support, and the shape of the figure is adapted to the shape of the dial plate by the step of pressing the two parts together during welding.

6. A method as claimed in claim 1 in which the surface of the figure to be welded is smooth.

7. A method as claimed in claim 1 in which the surface of the figure to be welded is made uneven before it is placed on the tool.

8. A method of fixing metal relief horological figures on a metal dial plate, comprising the steps of placing the horological relief figure on a tool with the figure surface which is to contact the dial plate facing outwardly of the tool, retaining the dial plate against a support with the dial plate surface to be provided with figures facing said figure, moving the contact surfaces of the horological figure and the dial plate together and pressing them tightly together in the desired position relative to each other, vibrating one of the two elements to be fixed together parallel to the other at an ultrasonic frequency during a period sufficiently long to permit the welding of the two contact faces while at the same time holding the two elements to prevent movement thereof parallel to each other a distance any greater than the amplitude of the vibrations, and thereafter separating the tool from the support while holding the dial plate with the horological figure fixed on its against said support in order to permit depositing of a new figure on the tool, and then displacing the dial plate in order to enable the fixing of a further figure thereto.

9. An apparatus for fixing metal relief horological figures on a metal dial plate, comprising an element, a source of ultrasonic vibrations with which said element is connected, said element having means for receiving and removably holding the horological figure to be welded against movement in the direction of vibration in an amount greater than the vibration amplitude, a support adapted to removably maintain a dial plate, and means on which said support is mounted adapted to move said support with a dial plate thereon into contact with the figure as it is held in said element and to press the dial plate against the figure in a direction perpendicular to the axis of the vibrations acting on the element.

10. An apparatus as claimed in claim 9 in which said element comprises a transmission rod connected to the source of ultrasonic vibrations, said source being an ultrasonic vibration generator imparting axial vibrations to said rod, said rod having a diameter that decreases in steps toward the end thereof remote from said generator for increasing the amplitude of vibration at its free end, and said means of receiving a figure comprising a tool at the free end of said rod having a surface for receiving the figure to be welded.

11. An apparatus as claimed in claim 10 in which said tool has a rubber piece on one side thereof adapted to be strongly pressed against the dial during welding.

12. An apparatus as claimed in claim 10 further comprising an adjustable wedge having a block of plastic material therein and positioned beneath the tool in order to prevent flexion of said transmission rod and to permit its vibration.

13. An apparatus as claimed in claim 9 in which the means for moving the dial plate support comprise an arm horizontally adjustable with respect to the figure-carrying means and having a press with a spindle, an overhanging head mounted on the end of said spindle and pivotable about an axis perpendicular to the travel of the spindle, an interchangeable support rotatably mounted on said head, said support having a dial plate-carrying surface, said surface having suction openings therein, and means adapted to connect said support to a vacuum source.

14. An apparatus as claimed in claim 13 in which said press has means for adjusting the travel of the spindle.

15. An apparatus as claimed in claim 13 in which said means adapted to connect said support to said vacuum source has a venting valve therein which upon its actuation interrupts the vacuum in the suction openings and permits removal of the dial plate from the support.

16. An apparatus as claimed in claim 13 in which the support for the dial plate comprises a notched wheel having twelve equally spaced positions at the locations of the figures to be welded to the dial plate.

17. An apparatus as claimed in claim 13 further comprising two guiding devices each having a vertical post integral with the arm, a ball bearing around said post, and a guiding bush integral with the spindle in which the ball bearing slides, one of said guiding devices being coaxial with the axis of the spindle and the other being parallel to the axis of the spindle and offset therefrom to compensate for flexion of the spindle due to the overhanging head.

18. An apparatus as claimed in claim 13 further comprising pneumatic and electrical actuating means coupled to said press and having an actuating lever for actuating said actuating means for lowering the spindle with the dial plate support until the dial plate on the support is pressed against a figure, a switch connected to said source of vibrations for starting the vibration generator at a predetermined time and said switch being positioned to be actuated by said spindle when said spindle reaches its lowermost position, and a time switch connected to said generator and to said actuating means and which acts after a period longer than the period of time during which the vibrations are generated for causing the said actuating means to be actuated to cause the spindle to rise.

19. An apparatus as claimed in claim 18 further comprising a device for conveying a new figure to the vibratory means, and a device for rotating the support for the dial plate each time the spindle rises.

20. An apparatus as claimed in claim 18 further comprising a stop on said apparatus which is adjustable so as to prevent welding of two figures on top of each other.

References Cited by the Examiner
UNITED STATES PATENTS

| | | | |
|---|---|---|---|
| 2,792,810 | 5/1957 | Maconegby | 269—21 X |
| 2,946,119 | 7/1960 | Jones et al. | 219—86 X |
| 3,029,666 | 6/1962 | Lovins | 29—470.1 X |
| 3,047,942 | 8/1962 | Schneider et al. | 29—470 |

FOREIGN PATENTS 188,926   1/1937   Switzerland.

WHITMORE A. WILTZ, *Primary Examiner.*

NEDWIN BERGER, THOMAS H. EAGER, *Examiners.*